US008642917B2

(12) United States Patent
Pershin et al.

(10) Patent No.: US 8,642,917 B2
(45) Date of Patent: Feb. 4, 2014

(54) HIGHLY ORDERED STRUCTURE PYROLITIC GRAPHITE OR CARBON-CARBON COMPOSITE CATHODES FOR PLASMA GENERATION IN CARBON CONTAINING GASES

(75) Inventors: Valerian Pershin, Mississauga (CA); Javad Mostaghimi, Mississauga (CA); Liming Chen, Toronto (CA)

(73) Assignee: Javad Mostaghimi, Mississauga, ON (CA)

( * ) Notice: Subject to any disclaimer, the term of this patent is extended or adjusted under 35 U.S.C. 154(b) by 0 days.

(21) Appl. No.: 13/438,664

(22) Filed: Apr. 3, 2012

(65) Prior Publication Data

US 2012/0201718 A1 Aug. 9, 2012

Related U.S. Application Data

(63) Continuation of application No. 12/227,439, filed as application No. PCT/CA2007/000846 on May 16, 2007, now Pat. No. 8,148,661.

(60) Provisional application No. 60/801,101, filed on May 18, 2006.

(51) Int. Cl.
*B23K 10/00* (2006.01)

(52) U.S. Cl.
USPC ............ 219/121.52; 219/121.36; 219/121.37; 219/121.5; 219/121.51; 219/121.55

(58) Field of Classification Search
USPC ............ 219/121.37, 121.38, 121.48–121.53, 219/121.55, 121.59
See application file for complete search history.

(56) References Cited

U.S. PATENT DOCUMENTS

| | | | |
|---|---|---|---|
| 3,324,333 | A | 6/1967 | Hahn |
| 3,410,746 | A | 11/1968 | Turkat |
| 3,569,661 | A | 3/1971 | Ebeling, Jr. |
| 4,304,984 | A | 12/1981 | Bolotnikov |
| 4,954,683 | A | 9/1990 | Hatch |
| 5,225,735 | A | 7/1993 | Tardy |
| 7,049,614 | B2 | 5/2006 | Rice |
| 2001/0043638 | A1 | 11/2001 | Wittle |
| 2006/0099135 | A1 | 5/2006 | Ypdh |
| 2006/0102606 | A1 | 5/2006 | Twarog |

*Primary Examiner* — Brian Jennison
(74) *Attorney, Agent, or Firm* — Lynn C. Schaumacher; Hill & Schumacher

(57) ABSTRACT

A cathode electrode for plasma generation. The cathode is made of graphite with highly ordered structure such as Pyrolitic Graphite or Carbon-Carbon composites. Furthermore, carbon containing gases will be used as plasma gas. The cathode will allow for theoretically an unlimited lifetime of the cathode.

6 Claims, 1 Drawing Sheet

HIGHLY ORDERED STRUCTURE PYROLITIC GRAPHITE OR CARBON-CARBON COMPOSITE CATHODES FOR PLASMA GENERATION IN CARBON CONTAINING GASES

CROSS REFERENCE TO RELATED U.S. APPLICATIONS

This patent application is a continuation application of U.S. Ser. No. 12/227,439 filed on Apr. 16, 2009, which was a National Phase application claiming the benefit of PCT/CA2007/000846 filed on May 16, 2007, in English, which further claims the priority benefit from U.S. Provisional Patent Application Ser. No. 60/801,101 filed on May 18, 2006, in English, titled HIGHLY ORDERED STRUCTURE PYROLITIC GRAPHITE OR CARBON-CARBON COMPOSITE CATHODES FOR PLASMA GENERATION IN CARBON CONTAINING GASES, the contents of which are incorporated herein by reference in their entirety.

FIELD OF THE INVENTION

The present invention relates generally to carbon based cathodes for DC plasma torches which include a long lasting thermionic cathode and a high thermal efficiency.

BACKGROUND OF THE INVENTION

Industrial types of direct current (DC) thermal spray plasma torches are built with a water-cooled tungsten cathode and a copper anode. Main plasma gas is argon. The use of argon is dictated by its inertness at high temperatures to the thermionic tungsten cathode. Thermionic cathodes emit electrons from their surface since their temperature is high enough for easy emission of electrons. Tungsten is the preferred cathode material since it is a refractory metal with high melting point temperature. It is however, highly reactive to oxygen at high temperatures. During the operation of the torch, cathode tip is melted and tungsten evaporates. The cathode erosion rate is directly dependent on its temperature. Cathode lifetime and consistency of its performance is an important issue in this technology.

One disadvantage of argon is its low thermal conductivity and its low enthalpy which results in reduced thermal efficiency of the DC plasma torches. The low thermal efficiency limits powder feed rate, deposition efficiency and coating quality. To enhance thermal conductivity and thermal efficiency, small amounts of hydrogen or helium are normally mixed with argon.

It is known that to reduce the erosion of the graphite cathodes, they must be cooled either by encasing them in a water-cooled metal jacket (see for example U.S. Pat. Nos. 4,490,825 and 4,304,980) or by external water spraying directly onto the electrode (U.S. Pat. No. 5,795,539). Direct internal water cooling of graphite electrodes is not practical since the cathode is normally made of polycrystalline graphite which has open porosity and, compared to metals, lower thermal conductivity. This leads to the infiltration of the cooling water through the electrode as well as a less effective heat removal. The latter imposes limits on power generated by the plasma torch.

It would be very advantageous to provide a DC plasma torch which has a long lasting thermionic cathode having a high thermal efficiency.

SUMMARY OF THE INVENTION

Accordingly, the present invention provides DC plasma torch embodiments which employ a carbon cathode made of graphite with highly ordered structure such as pyrolitic graphite or carbon-carbon composites. Furthermore, carbon containing gases are used as the plasma gas to give a long lifetime of the cathode since by using carbon the cathode is regenerated.

According the present invention, there is provided a cathode electrode for plasma generation, comprising:

a carbon-based cathode electrode having a chamber and a substantially planar outer electrode surface, said chamber having an interior surface spaced from said planar outer electrode surface, and a region of said carbon-based cathode electrode between said planar outer electrode surface and said interior surface, said carbon-based cathode electrode exhibiting anisotropic thermal properties such that said region has a thermal conductivity between said interior surface and said planar outer electrode surface, in a direction generally perpendicular to said planar outer electrode surface, that is greater than in any other direction in said region for dissipation of heat at said planar outer electrode surface.

A further understanding of the functional and advantageous aspects of the invention can be realized by reference to the following detailed description and drawings.

BRIEF DESCRIPTION OF THE DRAWINGS

Embodiments of the present invention are described in greater detail with reference to the accompanying drawings.

DETAILED DESCRIPTION OF THE INVENTION

Generally speaking, the systems described herein are directed to cathodes for DC plasma torches and plasma torches containing same. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed cathodes for DC plasma torches and DC plasma torches containing same.

As used herein, the term "about", when used in conjunction with ranges of dimensions of particles or other physical properties or characteristics, is meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present invention.

Embodiments of the present invention relate to cathodes for DC plasma torches which includes a long lasting thermionic cathode and has a high thermal efficiency. Specifically, the new design employs a solid cathode made of graphite with highly ordered structure such as pyrolitic graphite or Carbon-Carbon composites. Furthermore, carbon containing gases will be used as plasma gas. As it will be shown in the following paragraphs description, the above combination will allow for theoretically an unlimited lifetime of the cathode.

In order to improve the graphite electrode cooling and increase torch power, a graphite electrode made of high thermal conductivity pyrolitic graphite or of a carbon fiber-carbon matrix composite is used as the cathode electrode. Pyrolitic graphite structure has low crystal lattice defects and carbon atoms planes are placed parallel to each other, therefore the structure and its properties closely match those of the ideal graphite crystal. This specific crystal structure results in significant electrical and thermal properties anisotropy. Particularly, thermal conductivity varies considerably from 1100-1500 W/mK when measured within the plane compared to only 2 W/mK when measured perpendicular to the plane. Graphite fibers also have high thermal conductivity of up to 1200 w/mK which is four times higher than copper.

Figure 1:
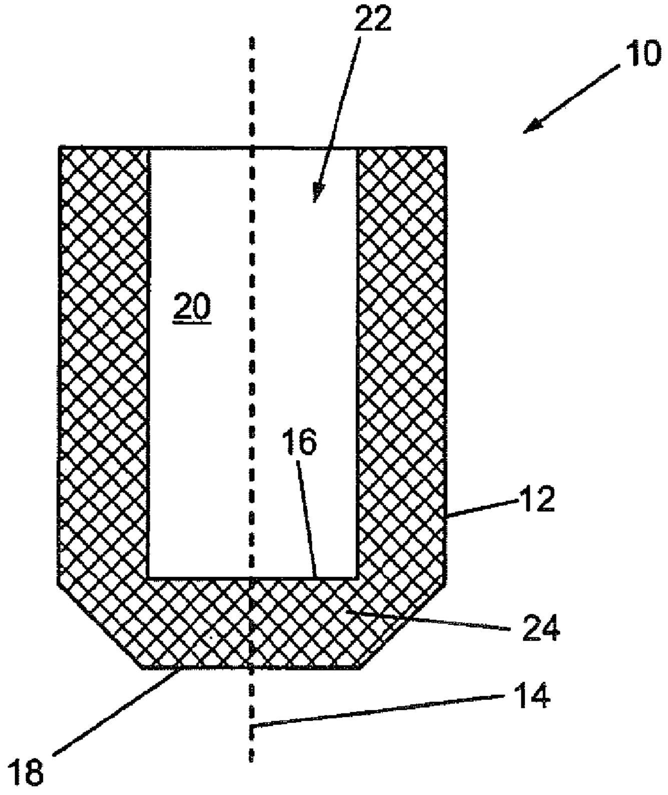
FIG. 1 shows a cross sectional view of a plasma torch cathode electrode constructed in accordance with the present invention.

Referring to FIG. 1, the cathode disclosed herein is shown generally at 10 and is made in the shape of a cylindrical cup 12 from graphite with a highly ordered, low defect crystal structure such as obtained using for example pyrolitic graphite or carbon fibers. The graphite structure has an orientation in such a way that the maximum thermal conductivity plane coincides with the axis 14 of the electrode from inner surface 16 to the outer surface 18. For the electrode made of a carbon fiber-carbon composite, the fibers must be aligned longitudinally along the electrode axis 14 as well. In other words the carbon fibers are parallel to axis 14 to give the optimum thermal conductivity from inner surface 16 to outer surface 18. This ensures the highest heat removal from area of the arc attachment. The density of pyrolitic graphite is high; it is close to the theoretical density of carbon (2.25 g/cm$^3$) which makes it essentially non-porous (Table 1). This allows for direct water cooling of the electrode 12 by flowing water into chamber 20 through the chamber opening 22 without infiltration of water through the cathode 10.

Figure 2:
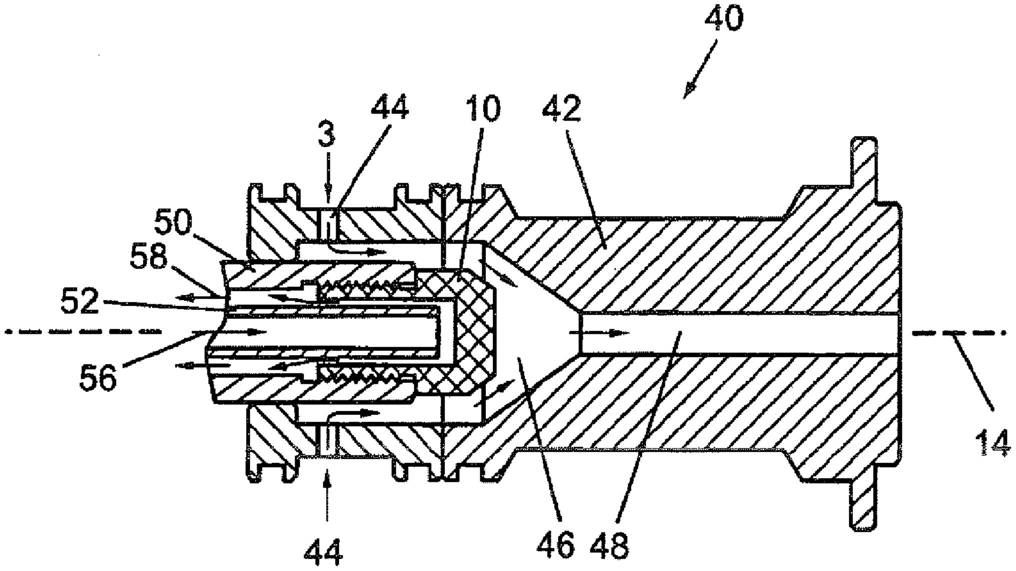
FIG. 2 shows a plasma torch containing the cathode electrode of FIG. 1.

Although graphite is evaporated during the torch operation, its erosion will be compensated by the precipitation of carbon ions on the graphite cathode. This reconstruction of the cathode 10 is only possible if the arc is operated in carbon containing gases. FIG. 2 shows a plasma torch 40 with graphite cathode 10, an anode 42 including an interior chamber 46 in communication with an exit passageway 48 and ports 44 for introducing plasma gas into chamber 46. Cathode 10 is preferably cylindrically shaped having an inner threaded portion and is threaded onto the end of an outer threaded mounting tube 50. An inner tube 52 is inserted into chamber 20 with one open end of the inner tube 52 being adjacent to and spaced from the interior surface 16 of cathode 10 and having a diameter smaller than diameter of the chamber 20 so that an annular passageway 58 is formed between an interior side wall of the chamber 20 and an outer surface of the inner tube 52. The second open end of the inner tube 52 is a fluid inlet for cooling fluid to flow down through inner tube 52 to contact interior surface 16 after which the fluid flows back through annular passageway 58 and out of the plasma torch. The anode includes ports 44 for introducing plasma gas into the interior chamber 46.

Cooling water to cool cathode 10 flows through the outer end of inner tube 52 and down central channel 56 around the end of inner tube 52 over the inner surface 16 (FIG. 1) of cathode 10 thereby cooling it, and out through annular channel 58 between inner tube 52 and outer tube 50. Because the molecular orientation of the constituent components of electrode 10 (whether graphite planes or longitudinal fibers) which run parallel to axis 14, so that the region 24 between inner surface 16 and the outer surface 18 of electrode 10 form planes of maximum thermal conductivity parallel to axis 14 so that surface 18 is cooled. In operation a sufficiently high DC voltage is applied between the cathode and anode electrodes and a gas mixture comprised of one or more carbon containing gases is flowed into the interior chamber 46 through the ports 44 and a plasma arc is formed in the chamber 46 and discharged through the passageway 48.

The gas mixture will be composed from hydrocarbons (methane, ethylene, propane, etc.) and carbon dioxide. Because of the high plasma temperature, hydrocarbons dissociate into free carbon and hydrogen. They are then ionized. Subsequently positive carbon ions move from the gas phase to the cathode emissive surface, where dynamic equilibrium between carbon evaporation and precipitation takes place. This process compensates cathode erosion and ensures long operation life.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

TABLE 1

GRAPHITE MATERIALS

| TYPE OR BRAND NAME | DENSITY [g/c$^3$] | THERMAL CONDUCTIVITY [W/mK] | REFERENCE |
|---|---|---|---|
| APG Pyrolitic Graphite | 23 | 1700 | 1 |
| Annealed Pyrolitic Graphite | 2.22 | 1100-1300 | 2 |
| Carbon Fiber | 1.8-2.2 | 1100 | 1, 5 |
| Graphite electrodes for steelmaking | 1.6-1.75 | 2.20-300 | 3, 4 |

References
1. Website of k-Technology Corporation (www.k-technology.com)
2. Website of Pyrogenics Group (www.pyrographite.com)
3. Website of SGL Carbon AG (www.sglcarbon.com)
4. Pierson, H. O. "Handbook of Carbon, Graphite, Diamond and Fullerense-Properties, Processing and Applications", William Andrew Publishing, 2001, pp 399.
5. Dresselhaus, M. S. "Graphite fibers and filaments", Springer-Verlag, 1988, 382 p.

Therefore what is claimed is:

1. A cathode electrode for plasma generation, comprising:

a carbon-based cathode electrode having a chamber and a substantially planar outer electrode surface, said chamber having an interior surface spaced from said planar outer electrode surface, and a region of said carbon-based cathode electrode between said planar outer electrode surface and said interior surface, said carbon-based cathode electrode exhibiting anisotropic thermal properties such that said region has a thermal conductivity between said interior surface and said planar outer electrode surface, in a direction generally perpendicular to said planar outer electrode surface, that is greater than in any other direction in said region for dissipation of heat at said planar outer electrode surface.

2. The cathode electrode according to claim 1 wherein said carbon-based cathode electrode has a generally cylindrical shape having a planar end coinciding with said planar outer electrode surface, said carbon-based cathode electrode including a cylindrical axis which extends symmetrically through said planar outer electrode surface and said interior surface, and wherein said maximum thermal conductivity occurs parallel to said cylindrical axis.

3. The cathode electrode according to claim 2 wherein said carbon-based cathode electrode is made of pyrolitic graphite having highly ordered, low defect crystal structure, and an orientation such that a maximum thermal conductivity plane of the pyrolitic graphite is parallel with the cylindrical axis of the carbon-based cathode electrode from said interior surface to the planar outer electrode surface.

4. The cathode electrode according to claim 2 wherein said carbon-based cathode electrode is made of carbon fibers, wherein the carbon fibers are aligned longitudinally along the cylindrical axis of the carbon-based cathode electrode parallel thereto.

5. The cathode electrode according to claim 1 wherein said carbon-based cathode electrode has a liquid inlet for admitting liquid coolant to said chamber to cool said interior surface.

6. The cathode electrode according to claim 1 wherein said carbon-based cathode electrode is for use for plasma generation in carbon containing gases.

* * * * *